United States Patent
Lemarchand

(10) Patent No.: US 10,273,014 B2
(45) Date of Patent: Apr. 30, 2019

(54) OIL COOLER INTEGRATED INTO THE PYLON

(71) Applicant: SAFRAN AIRCRAFT ENGINES, Paris (FR)

(72) Inventor: Kevin Morgane Lemarchand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 260 days.

(21) Appl. No.: 15/255,043

(22) Filed: Sep. 1, 2016

(65) Prior Publication Data

US 2017/0066540 A1   Mar. 9, 2017

(30) Foreign Application Priority Data

Sep. 4, 2015 (FR) ...................................... 15 58229

(51) Int. Cl.
*B64D 27/26* (2006.01)
*B64D 15/06* (2006.01)
(Continued)

(52) U.S. Cl.
CPC ............. *B64D 27/26* (2013.01); *B64D 15/06* (2013.01); *B64D 27/20* (2013.01); *B64D 33/08* (2013.01);
(Continued)

(58) Field of Classification Search
CPC ........ B64D 27/26; B64D 27/20; B64D 15/06; B64D 33/08; B64D 2027/266; F02C 7/20
See application file for complete search history.

(56) References Cited

U.S. PATENT DOCUMENTS 3,638,421 A * 2/1972 Chilman .................... F02C 7/20
244/54
5,687,561 A * 11/1997 Newton ............... B64D 41/007
60/226.1
(Continued)

FOREIGN PATENT DOCUMENTS

EP   2474472 A1   7/2012
FR   2951701 A1   4/2011

OTHER PUBLICATIONS

Search Report in French Application No. 1558229 dated Jun. 21, 2016, with English translation coversheet. 7 pages.

*Primary Examiner* — Philip J Bonzell
(74) *Attorney, Agent, or Firm* — Womble Bond Dickinson (US) LLP

(57) ABSTRACT

The invention relates to a suspension pylon comprising:
  at least one arm (3) for suspending a propulsion unit (4) from the fuselage (2) of an airplane (1),
  an oil exchange circuit (70) configured to be connected, on the one hand, to an oil pump (5) in the fuselage (2) and on the other hand, to the propulsion unit (4) the arm (3) whereof provides for suspension, said circuit (70) comprising a feed line (72) and a return line (74), which both extend inside said arm (3),
  an intermediate shaft (6) which extends in said arm (3), said shaft being configured, on the one hand, to be driven by the propulsion unit (4) the arm (3) whereof provides for suspension and, on the other hand, to drive the oil pump (5) in the fuselage (2),
wherein the arm (3) has a structure adapted for cooling the oil exchange circuit at the arm (3).

10 Claims, 2 Drawing Sheets

(51) Int. Cl.
*B64D 27/20* (2006.01)
*B64D 33/08* (2006.01)
*F01D 25/20* (2006.01)
*F02C 7/20* (2006.01)

(52) U.S. Cl.
CPC ............... *F01D 25/20* (2013.01); *F02C 7/20* (2013.01); *B64D 2027/266* (2013.01); *F05D 2220/323* (2013.01)

(56) References Cited

U.S. PATENT DOCUMENTS

| | | | | |
|---|---|---|---|---|
| 5,694,765 | A * | 12/1997 | Hield | F02C 3/113 60/39.163 |
| 5,845,483 | A * | 12/1998 | Petrowicz | F02C 7/262 60/788 |
| 9,062,611 | B2 * | 6/2015 | Sheridan | F02C 7/32 |
| 9,719,428 | B2 * | 8/2017 | Winter | F02C 7/32 |
| 9,856,031 | B2 * | 1/2018 | Tateiwa | B64D 29/02 |
| 2009/0139243 | A1 * | 6/2009 | Winter | F02C 7/32 60/802 |
| 2012/0117940 | A1 * | 5/2012 | Winter | F02C 7/32 60/226.3 |
| 2015/0232188 | A1 * | 8/2015 | Tateiwa | B64D 29/02 244/54 |
| 2015/0308340 | A1 * | 10/2015 | Tateiwa | F02C 7/16 415/178 |
| 2017/0248077 | A9 * | 8/2017 | Tateiwa | F02C 7/16 |

* cited by examiner

OIL COOLER INTEGRATED INTO THE PYLON

GENERAL TECHNICAL FIELD AND PRIOR ART

The general field of the invention is that of the suspension of propulsion units from the fuselages of airplanes.

For its part, the invention proposes a suspension pylon architecture optimized for oil cooling and/or de-icing.

The attachment of a propulsion unit to the fuselage of an airplane is generally accomplished at the rear of the fuselage on a suspension mast of the airplane, also called a pylon. The engine generally comprises a turbine engine. An accessory gear box (AGB) is for its part customarily positioned in the engine nacelle. It is driven by a power takeoff from the turbine engine and feeds various associated equipment or accessories: lubrication oil pumps, electricity generators, etc.

Nevertheless, the gearbox and the equipment are voluminous and force the designers to thicken the nacelles, which reduces performance of the airplane (increased drag, etc.).

Certain current developments tend to displace the gearboxes toward the high pressure areas of the turbine engines, particularly above the compressor (between the primary and secondary flows), to save room in the thickness of the nacelles and particularly optimize use of space and thus reduced the drag of the nacelle. Thermal loads are thereby intensified.

However, the oil cannot withstand heating beyond a certain limit (generally around 160° C.) without deteriorating (a coking phenomenon which causes the oil to become abrasive and causes it to lose its lubricating properties).

Solutions involving forced cooling, with air bled from one of the flows, make it possible to hold the temperature but cause a reduction in performance of the turbine engine.

Consequently, there exists and important need linked with problems of oil heating.

Moreover, the suspension pylons have consequent problems of icing, particularly at their leading edges.

There also exists an important need for a simple and inexpensive solution making it possible to correct this icing problem.

PRESENTATION OF THE INVENTION

A general goal of the invention is to solve at least one of these problems.

In particular, one goal of the invention is to propose a solution which allows cooling, without however harming the performance of the airplane.

In particular, one aim of the invention is to propose a solution which allows cooling while limiting bleeding of air intended for the engine.

Another goal of the invention is to propose a solution which allows cooling and limits the thickness of the nacelle.

Also, one aim of the invention is to propose a simple and inexpensive solution for de-icing the suspension pylons for propulsion units suspended from airplane fuselages.

To this end, the invention proposes a suspension pylon comprising:
  at least one arm for suspending a propulsion unit from the fuselage of an airplane,
  an oil exchange circuit configured to be connected, on the one hand, to an oil pump in the fuselage and on the other hand, to the propulsion unit the arm whereof provides for suspension, said circuit comprising a feed line and a return line which both extend inside said arm,
  an intermediate shaft which extends in said arm, said shaft being configured, on the one hand, to be driven by the propulsion unit the arm whereof provides for suspension and, on the other hand, to drive the oil pump in the fuselage, wherein the arm has a structure adapted for cooling the oil exchange circuit at the arm.

Such a pylon architecture makes possible cooling of the oil at the same time as a reduction in the volume occupied by the equipment at the propulsion unit. In fact, thanks to the intermediate shaft, the pump is displaced to the interior of the fuselage, which reduces the volume occupied by the accessories at the propulsion group. This pylon architecture further favours pylon de-icing.

Such a pylon architecture is further advantageously complemented by the different features hereafter, taken alone or in any of their technically feasible combinations:
  the arm comprises a plurality of cooling compartments through which the oil return line circulates;
  the compartments are filled with oil;
  the compartments are fed with oil from the feed line;
  the compartments comprise valves for allowing or preventing fluid communication between the different compartments;
  the pylon further comprises an intermediate bearing located in the arm and supporting the intermediate shaft, wherein the intermediate bearing is lubricated from the oil exchange circuit.

The invention further relates to an assembly comprising such a pylon and an accessory gearbox, said box being located in the fuselage, said box being driven by the intermediate shaft and the oil pump being driven by the gearbox.

It also proposes an assembly comprising such a pylon or an assembly of the above type and also comprising a propulsion unit.

It further relates to an airplane comprising such an assembly in which the propulsion unit is attached to the fuselage in a rearward lateral position and the propulsion unit comprises a turbine engine.

PRESENTATION OF THE FIGURES

Other features, aims and advantages of the invention will be revealed by the description that follows, which is purely illustrative and not limiting, and which must be read with reference to the appended drawings, in which.

DETAILED DESCRIPTION

Figure 1:
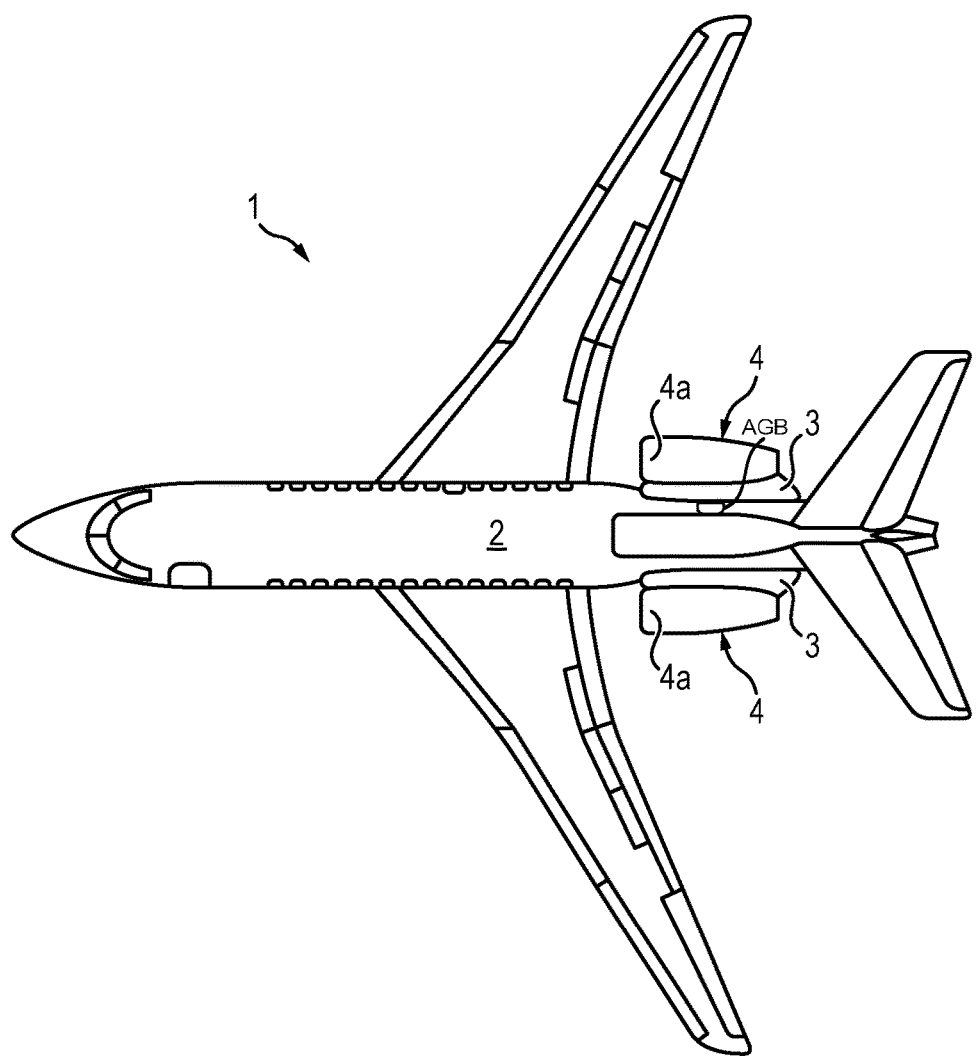
FIG. 1 shows an airplane with attachment of the engines to the fuselage.

The airplane 1 shown in FIG. 1 comprises a fuselage 2 and several propulsion units 4 suspended on the rear portion of the fuselage 2 by means of pylons 3.

One propulsion unit 4 typically comprises a turbine engine positioned in a nacelle.

Figure 2:
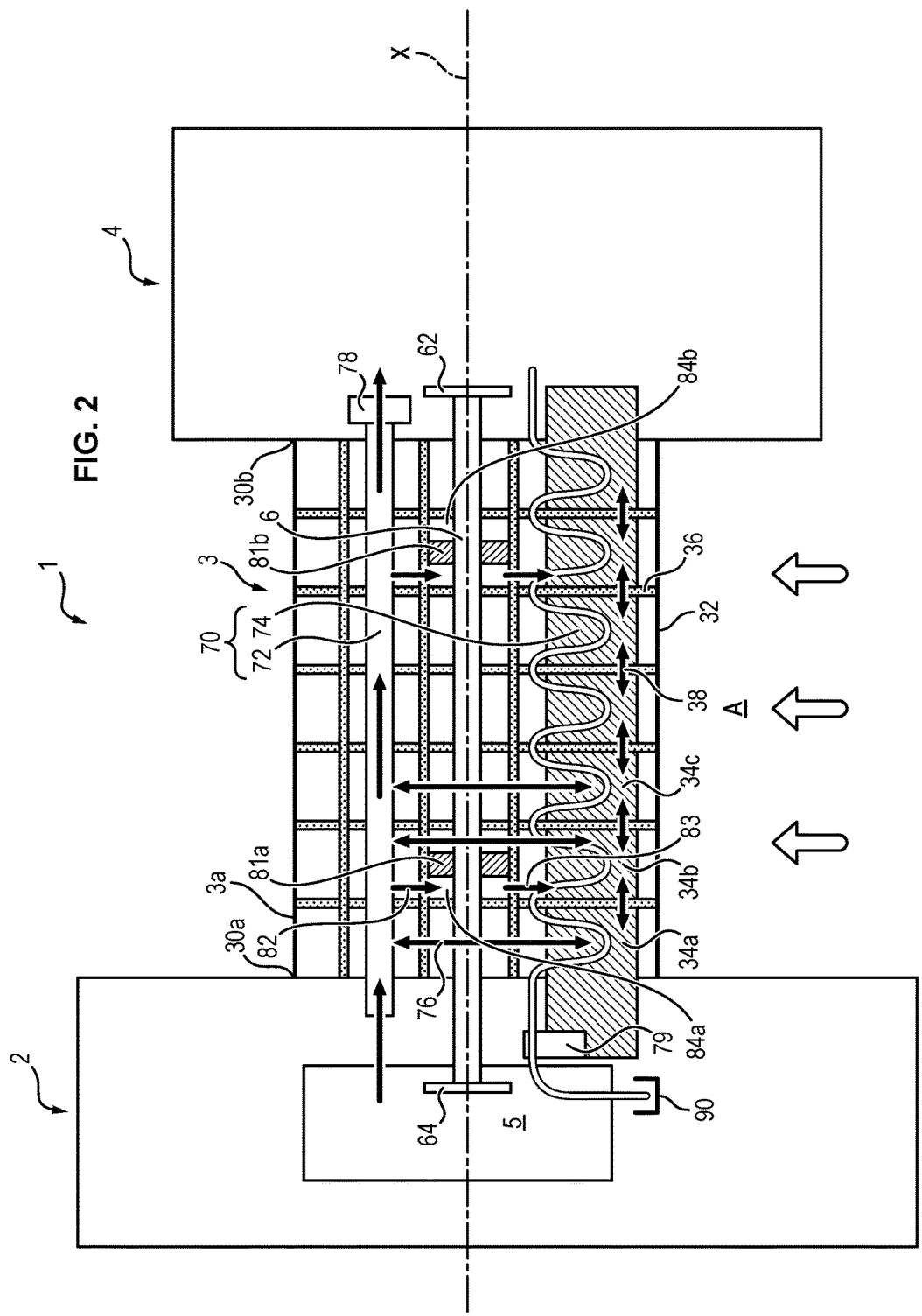
FIG. 2 shows one embodiment of the invention, with in particular the fuselage of the airplane, the pylon and the propulsion unit represented there.

As illustrated schematically in FIG. 2, a pylon 3 is a hollow rigid profiled suspension arm 3a which is attached on one side, by an end 30a to the fuselage 2 of the airplane 1 and on the other, by an end 30b, to the propulsion unit 4 whereof it provides the suspension. The main direction along which the hollow arm 3a extends has been shown schematically by the axis X.

An oil pump 5 is positioned in the fuselage 2 and is driven by a gear box or AGB. It is connected to the propulsion unit, preferably a turbine engine 4, by an oil exchange circuit 70 comprising a feed line 72, in which oil circulates from the pump 5 to the propulsion unit 4 and a return line 74 in which the oil circulates from the propulsion unit 4 to the pump 5.

The oil exchange circuit 70 therefore runs through the pylon 3 and therefore extends between the two ends 30a, 30b of the pylon along the longitudinal direction X.

An intermediate shaft 6 is positioned in the pylon 3 to drive the oil pump 2 from the turbine engine 4. The shaft 3 preferably extends substantially along the longitudinal direction X.

A mechanical angle drive 62 makes it possible to take power from the turbine engine 4 and another mechanical angle drive 64 makes it possible to transmit this power to the oil pump 2.

When the engines are in operation, the intermediate shaft 6 is therefore in rotation inside the pylon 3.

The oil pump 5 therefore supplies the propulsion unit 4 with oil via the feed line 72, particularly for lubrication. This oil is heated in the propulsion unit 4 and must be cooled. The return line 74, located inside the pylon 3 which is, for its part, in contact with the outside air, allows cooling of the oil by forced convection, due to the elevated speed of the air A in flight. Both exchange media are therefore forced (the oil is pumped and the flow of air due to the displacement of the airplane). The heat transfer is more effective because the air A at the leading edge 32 of the pylon 3 is colder than the air of the secondary flow in the usual technique, because it has not undergone the compression of the fan of the turbine engine 4.

The pylon 3, besides its structural role in holding the turbine engine and its aerodynamic role (optimization of flow) thus also serves as a heat exchanger.

In this manner, a cooling system is obtained which does not prejudice the performance of the airplane 1, because the thickness of the nacelles is less constrained by the integration of numerous pieces of equipment and no forced cooling by bleeding flows from the engines is necessary.

In fact, some equipment like the pump 5 have been displaced into the fuselage 2, which makes it possible to leave only equipment of smaller volume in the nacelle of the turbine engine.

To favour cooling, the return line 74 is positioned in proximity to the leading edge of the pylon 3, where the effect per unit area of the heat exchange is greatest. In FIG. 2, the leading edge has been labelled 32, the arrows illustrating the direction of the air flow when the airplane is moving.

One consequence linked to cooling the returned oil is the heating of the leading edge 32, which makes it possible to contribute to the de-icing of the pylon. It is now possible to dispense with a dedicated electric de-icing system, which is costly and consumes much energy.

In one embodiment, if necessary as a supplement to the heat exchanger configuration of the pylon 3, it comprises a plurality of the sealed cooling compartments 34a, 34b, 34c through which the return line 74 circulates.

Typically, having few compartments makes it possible to limit mass but increases the risk in the event of failure of one of the compartments. Preferably, the number of sealed compartments is comprised between 2 and 20.

These compartments 34 are filled with a heat transfer fluid which allows heat exchange between the exterior air of the pylon 3 and the oil in the return line 74.

The compartments 34 allow independence of heat exchanges, particularly in the case where an impact may locally damage the pylon 3 and open a compartment 34a. The redundancy of the compartments 34 then makes it possible to guarantee effective cooling operation.

The compartments 34 are preferably all located at the leading edge 32 and are side by side along the longitudinal direction X.

The return line 74 winds inside said compartments 34, which makes it possible to increase the length of the return line 74 in contact with the heat transfer fluid.

It is possible to foresee that certain portions of the return line 74 are outside the compartments 34, so as for example to position temperature sensors in them.

The heat transfer fluid of the compartments 34 can in particular be oil, of the same type as that circulating in the oil exchange circuit 7, which constitutes an advantage in terms of maintenance.

An exchange duct 76 connecting the feed line 73 and at least one compartment 34 makes it possible to bring oil to said compartment 34. It is possible to allow for as many exchange ducts 76 as there are compartments 34a, 34b, 34c. This duct 76 allows a rapid decrease in the temperature of the compartments 34. In fact, when the airplane 1 is on the ground, the cooling function is not fully effective (air speed is practically zero, air temperature is moderate, but the propulsion unit is operating). Moreover, in the event of a leak, the exchange duct 76 makes it possible to maintain a certain level of oil in the compartments 34.

The compartments 34 can be formed by longerons 36 of the pylon 3. In particular, the so-called horizontal longerons, extending in the longitudinal direction X and the so-called vertical longerons, extending perpendicular to this direction, define the volumes of the compartments 34.

As a variant, the compartments 34 comprise valves 38 which allow or prevent fluid communication between two compartments 34a, 34b. Using sensors and actuators, these valves 38 have the purpose of allowing exchanges of heat transfer fluids between the different compartments 34a, 34b, 34c . . . to make the temperature uniform over all the compartments 34. As mentioned previously, it is important to be able to also guarantee the sealing of the compartments in the event of damage to the pylon 3, which occurs often at the leading edge 32 by external bodies which strike the pylon. If necessary, the oil feeding to the exchange duct 76 in relation with the compartment which is no longer sealed is cut.

The intermediate shaft 6 transmits power from the propulsion unit 4 to the pump 5 by rotation. Bearings 8 are then provided to support the shaft and allow its rotation.

Moreover, a bearing 8 can be provided at each end of the shaft 6, i.e. at the fuselage 2 and at the propulsion unit 4. Due to the bending of the intermediate shaft 6, dynamic effects can occur on the shaft 6, with the risk of damage.

To correct this, at least one intermediate bearing can be provided in the pylon 3. Several intermediate bearings 81a, 81b can be positioned in the pylon 3, to support the weight of the shaft 6 at regular intervals. The intermediate bearings 81a, 82b are typically housed in enclosures 84a, 84b.

The intermediate bearings 81a, 81b can for example be supported on longerons.

As for any bearing, it is necessary to lubricate the intermediate bearings 81a, 81b. In an advantageous embodiment, an oil intake duct 82 draws oil from the feed line 78 and carries it to the enclosure 84a, 84b where the intermediate bearing 81a is housed.

An oil exhaust duct 83 returns the oil from the enclosure 84a of the intermediate bearing 81a to the return line 74. The oil exchange circuit 70 already present in the pylon 3 is thus taken advantage of.

Moreover, the intermediate bearing 81 is then lubricated with so-called "cold", i.e. unheated and/or previously cooled, oil.

The pylon then comprises for example as many oil intake ducts 82 and oil exhaust ducts 83 as there are intermediate bearings 81a, 81b.

Depending on the disposition of the intermediate bearings along the longitudinal direction X of the pylon, sharing of the ducts can be carried out.

Alternatively, if several bearings 82a, 82b, . . . are housed in one enclosures 84a or 84b, a single oil intake 82 and oil exhaust 84 duct per enclosure 84 is sufficient.

In the case of the bearings 8 located in the fuselage 2 and the propulsion unit 4, it is possible to provide similar ducts, the only difference being that said ducts will not be located in the pylon.

A filter 78 can be positioned between the feed line 72 and the propulsion unit 4, so as to ensure that no solid particle reaches said propulsion unit 4, where the oil is used to lubricate high-speed rotating elements in a hot environment.

During its use by the propulsion unit 4, the oil can absorb air, particularly when it is sprayed there. A de-oiler 79 can be positioned in the oil exchange circuit 7, and preferably at the end of the return line 74 i.e. in the fuselage, in proximity to the pump 5.

An oil reservoir 90 can also be provided between the oil pump 5 and the return line 74. It provides for a buffer and for having a reserve of cold oil available, particularly for phases when the airplane is on the ground.

In one embodiment, all the equipment related to the oil are positioned in the fuselage 2 and are driven by the intermediate shaft 6, through gearing (not shown in the figures).

The accessory gearbox which drives the oil pump 5 is in its turn driven by the intermediate shaft 6. It can be positioned in the fuselage 2, with the pump 5 in immediate proximity thereto. Thus, in this embodiment, it is the totality of all the AGB and equipment which are deported to the fuselage, which allows the propulsion unit 4 to be massively relieved of their bulk. The consequences can be a thin nacelle and limited air bleed from the turbine engine 4 so that as much of the air flow passing through it as possible serves for propulsion.

The invention claimed is:

1. A suspension pylon comprising:
   at least one arm, with a first and a second extremity, for suspending a propulsion unit, at the first extremity, from a fuselage of an airplane, at a second extremity,
   an oil exchange circuit configured to be connected on one side to an oil pump in the fuselage and on the other side to the propulsion unit, wherein the arm provides the suspension, said circuit comprising a feed line and a return line, which both extend inside said arm,
   an intermediate shaft which extends in said arm from the first extremity to the second extremity, said shaft being configured, on one side of the intermediate shaft, to be driven by the propulsion unit, wherein the arm provides the suspension and, on the other side of the intermediate shaft, to drive the oil pump in the fuselage,
   wherein the arm has a structure adapted for cooling the oil exchange circuit at the arm.

2. The pylon according to claim 1, wherein the arm comprises a leading edge, and wherein the return line is located at the leading edge to favour cooling of the oil and to favour de-icing of said leading edge.

3. The pylon according to claim 1, further comprising an intermediate bearing located in the arm and supporting the intermediate shaft, wherein the intermediate bearing is lubricated from the oil exchange circuit.

4. The pylon according to claim 1, wherein the arm comprises a plurality of cooling compartments through which the return line circulates.

5. The pylon according to claim 4, wherein the compartments comprise valves for allowing or preventing fluid communication between the different compartments.

6. The pylon according to claim 4, wherein the compartments are filled with oil.

7. The pylon according to claim 6, wherein the compartments are fed with oil from the feed line.

8. An assembly comprising a pylon according to claim 1 and an accessory gearbox, said accessory gearbox being located in the fuselage, said box being driven by the intermediate shaft and the oil pump being driven by the gearbox.

9. The assembly according to claim 8, also comprising a propulsion unit.

10. An airplane comprising an assembly according to claim 9, wherein the propulsion unit is attached to the rear fuselage and the propulsion unit comprises a turbine engine.

* * * * *